(12) United States Patent
Neuberger

(10) Patent No.: US 9,411,113 B2
(45) Date of Patent: Aug. 9, 2016

(54) FIBER OPTIC CONNECTOR FOR LASER SOURCES

(71) Applicant: Biolitec Pharma Marketing Ltd., F.T. Iabuan (MY)

(72) Inventor: Wolfgang Neuberger, Dubai (AE)

(73) Assignee: Biolitec Pharma Marketing LTD, Labuan (MY)

( * ) Notice: Subject to any disclaimer, the term of this patent is extended or adjusted under 35 U.S.C. 154(b) by 0 days.

(21) Appl. No.: 14/443,376

(22) PCT Filed: Nov. 18, 2013

(86) PCT No.: PCT/IB2013/060222
§ 371 (c)(1),
(2) Date: May 16, 2015

(87) PCT Pub. No.: WO2014/076677
PCT Pub. Date: May 22, 2014

(65) Prior Publication Data
US 2015/0316735 A1    Nov. 5, 2015

Related U.S. Application Data

(60) Provisional application No. 61/727,514, filed on Nov. 16, 2012.

(51) Int. Cl.
| | | |
|---|---|---|
| *G02B 6/36* | (2006.01) | |
| *G02B 6/42* | (2006.01) | |
| *G02B 6/38* | (2006.01) | |

(52) U.S. Cl.
CPC .............. *G02B 6/4296* (2013.01); *G02B 6/387* (2013.01); *G02B 6/3821* (2013.01); *G02B 6/3851* (2013.01); *G02B 6/3887* (2013.01); *G02B6/3895* (2013.01); *G02B 6/4231* (2013.01); *G02B 6/4292* (2013.01); *G02B 6/3849* (2013.01)

(58) Field of Classification Search
CPC .............................. G02B 6/387; G02B 6/3821
See application file for complete search history.

(56) References Cited

U.S. PATENT DOCUMENTS

| | | | | |
|---|---|---|---|---|
| 5,293,582 A | * | 3/1994 | Beard | G02B 6/3821 385/78 |
| 6,808,116 B1 | * | 10/2004 | Eslambolchi | G01S 13/825 235/375 |
| 2008/0121047 A1 | * | 5/2008 | Bianchi | G01L 5/0057 73/862.51 |

*Primary Examiner* — Omar R Rojas
(74) *Attorney, Agent, or Firm* — BJ Associates; Bolesh J. Skutnik

(57) ABSTRACT

Connectors for optically coupling radiation accurately from radiation sources into waveguides in medical applications are provided. A preferred embodiment for coupling laser sources into optical fibers provides a connector comprising an outer body for handling connector; a two-part ferrule; an inner body which protects ferrule and holds its two parts together; a collet chuck through which an optical fiber is introduced; a spring; a ferrule interlock; and bending protection with a long fiber protection end. Main features are that the inner body moves within the outer body longitudinally, the spring-loaded ferrules move against a fixed position element in the laser housing via the spring load, and their relative shapes are designed to be assembled in only one possible angle position, thus maintaining alignment of elements to reduce/avoid lost power absorbed by the connector's proximal end due to coupling. The ferrule is mounted inside the connector and does not emerge from it for protecting the ferrule. In another embodiment the connector provides an electronic signature such as an RFID tag for waveguide recognition in a position close enough to the laser source to ensure identification. Additionally, the connector has an optional electric power and signal port.

13 Claims, 3 Drawing Sheets

FIBER OPTIC CONNECTOR FOR LASER SOURCES

CROSS REFERENCE TO PRIORITY APPLICATION

This patent application claims priority to U.S. provisional patent application No. 61/727,514, filed 16 Nov., 2012, by Wolfgang Neuberger/Biolitec Pharma Marketing Ltd entitled, "FIBER OPTIC CONNECTOR FOR LASER SOURCES" which is hereby expressly incorporated by reference in its entirety as part of the present disclosure.

BACKGROUND OF THE INVENTION

1. Field of the Invention

The present invention relates to fiber optic connectors for coupling radiation from radiation sources into waveguides; and more particularly it refers to connectors for coupling a laser device with optical fibers.

2. Invention Disclosure Statement

Connectors for coupling radiation from radiation sources into waveguides are meant for transmitting radiation with the main concern of reducing potential losses of radiation as much as possible. Losses of radiation in the interconnection between radiation sources and waveguides lead to a limited performance of the system reducing its overall efficiency and may provoke damage or destruction of the waveguides and/or the connectors.

There are different reasons for light losses which may occur during transmission of light signal during the interconnection process between radiation sources and waveguides. The amount of power delivered from a radiation source into a waveguide depends on the optical properties of both the radiation source and the waveguide. In general, the coupling loss of fiber optic connector results from poor fiber alignment and end preparation, fiber mismatches, and Fresnel reflection. As there is little of control over coupling loss resulting from fiber mismatches which are inherent fiber properties, fiber alignment renders as one of the critical parameters in maintaining low the total coupling loss. Hence, one of the main objectives when designing an optical connector is to reduce the amount of optical power lost at fiber optic connections mainly by maintaining fiber alignment and proper sizing. Good coupling efficiency requires precise positioning of the fiber to center the core in the focused laser beam.

To overcome the disadvantages of prior art connectors, a tunable fiber optic connector and method for assembly is disclosed in U.S. Pat. No. 6,695,489 by Nault. The connector includes a ferrule that is retainably engaged within a hub; a rear housing; and a front housing. The rear housing is sized to receive and rotationally retain the hub and the front housing has a bore that receives and engages the exterior surface of the rear housing. The front and rear housing include engagement members that allow the rear housing to be retained within the front housing and rotated relative to the front housing between discrete positions. However it differs from present invention as the tunable property is between the front and rear housings and the relative movement is a rotation movement.

Another example of fiber optic connectors for coupling laser energy into optical fibers, and more specifically into small core fibers, is disclosed in US patent application publication No. 2008/0175539 by Brown. It discloses a termination arrangement bearing a transparent ferrule fused to an end of an optical fiber to increase the coupling area without altering the input numerical aperture of the fiber system, accomplished by controlling the length of the area at which the transparent ferrule is fused or welded. In addition, an extended ferrule portion is situated behind the fusion area and is separated from the fiber core such that light that fails to couple to the core is reflected from the inner diameter of the extended ferrule portion away from the fiber core, where it can be deflected or dissipated by a beam block or absorptive material.

However, there is still a need for an improved and efficient device for linking radiation sources into waveguides, and more specifically medical devices and optical fibers in order to enhance the efficiency of the laser system and the delivery of laser energy to the tissue in a safe and efficient and cost-effective manner in medical applications. The enhanced device should be safe, easy to assemble, cost effective, and reliable in comparison with prior art devices, while allowing an effective coupling and efficient delivery laser energy to tissue. Present invention addresses these needs by providing compact, simple, reliable, safe and cost effective connectors.

OBJECTIVES AND BRIEF SUMMARY OF THE INVENTION

It is an objective of the present invention to provide a new generation of connectors for coupling radiation from radiation sources into waveguides.

It is also an objective of the present invention to provide connectors with features that enhance the efficiency of radiation sources and the delivery of radiation energy in a safe and efficient manner.

It is yet another objective of the present invention to provide fiber optic connectors with a good connection between the different parts of the connector.

Briefly stated, the present invention provides connectors for optically coupling radiation from radiation sources into waveguides in medical applications. A preferred embodiment for coupling laser sources into optical fibers provides a connector comprising an outer body for handling connector; a two-part ferrule; an inner body which protects ferrule and holds its two parts together; a collet chuck through which an optical fiber is introduced; a spring; a ferrule interlock; and a bending protection with a long fiber protection end. Main features are that the inner body moves within the outer body longitudinally, the spring-loaded ferrules move against a fixed position element in the laser housing via the spring load, and their relative shapes are designed to be assembled in only one possible angle position, thus maintaining the alignment of elements to reduce/avoid the lost power absorbed by the connector's proximal end due to the coupling. The ferrule is mounted inside the connector and does not emerge from it for protecting the ferrule. In another embodiment the connector provides an electronic signature such as a RFID tag for waveguide recognition in a position close enough to the laser source to ensure identification. Additionally, the connector has an optional electric power and signal port.

The above and other objects, features and advantages of the present invention will become apparent from the following description read in conjunction with the accompanying drawings (in which like reference numbers in different drawings designate the similar elements).

DETAILED DESCRIPTION OF PREFERRED EMBODIMENTS

The invention described herein provides many advantages over prior art alternative connectors for optically coupling electromagnetic radiation from radiation emitting devices into waveguides, for medical applications. In a preferred embodiment, present invention provides connectors for coupling the radiation from medical laser devices into optical fibers. The medical laser devices referred to are laser devices intended for the delivery of laser light to soft or hard tissue with at least one waveguide in contact or non-contact mode during surgical procedures, including via endoscopes, introducers, catheters, or similar. The connectors are also designed for coupling medical devices with waveguides for use in non-contact mode for non-surgical procedures, such as diode laser devices for photodynamic therapy treatments or transdermal treatments. The use of this type of connector enhances the safety and efficiency of medical treatments, as it reduces the output losses at the distal end of the fiber. An additional advantage of the design of these connectors is that it protects the sensitive polished fiber ends as well as the connector itself. Other advantages of the fiber optic connectors of present invention are that they are easy to assemble, reliable and cost effective.

In the present invention, "proximal" or "proximal end" refers to a location that is closest to the radiation source and "distal" or "distal end" refers to a location that is farthest to the radiation source.

Figure 1:
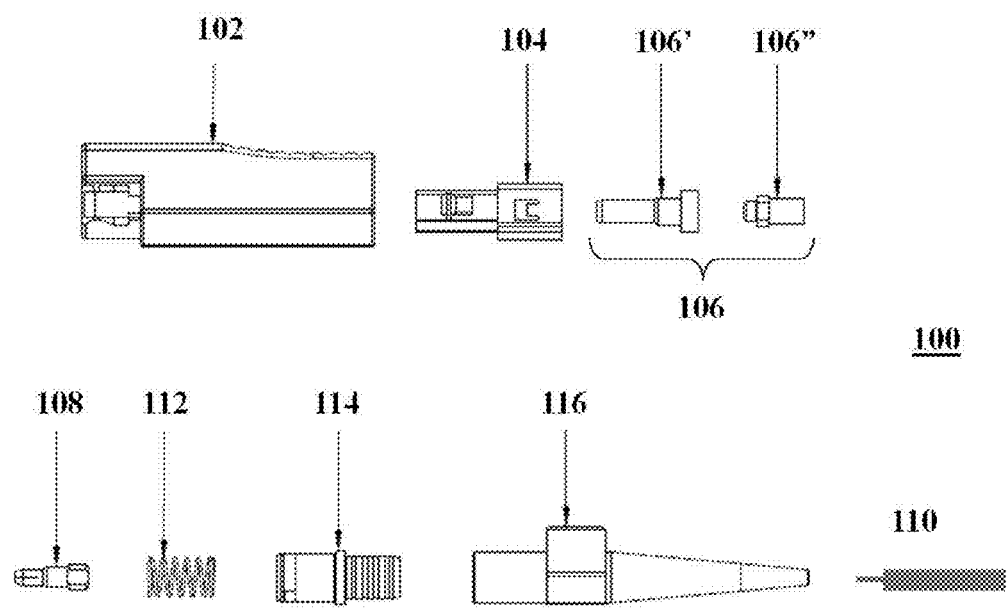
FIG. 1 depicts a preferred embodiment of present invention illustrating the different parts of a connector for coupling diode laser sources into optical fibers.

In a preferred embodiment shown in FIG. 1, connector 100 for coupling laser sources into optical fibers comprises outer body 102 for handling connector 100; inner body 104, inside outer body 102, which protects ferrule 106 and holds it together; ferrule 106 consisting of first part 106' and second part 106" that fit into each other; collet chuck 108, through which optical fiber 110 is introduced; spring 112 with high spring constant to hold ferrule 106 in place; ferrule interlock 114 for locking ferrule 106 in place; and bending protection 116 with long fiber protection end at its distal end. Ferrule 106 compresses collet chuck 108 closed around optical fiber 110. One advantage of this connector is that shrinking sleeves are used to ensure a good connection between the different parts of the connector, especially between collet chuck 108 and ferrule 106. Another advantage is that the ferrule is spring-loaded to control the force and position when the connector is assembled. In addition, the connector has an optional electric power and signal port, both to communicate and to supply electric power. In a preferred embodiment, this port is a Universal Serial Bus (USB) port.

Additionally, the connector is equipped with an electronic signature for waveguide recognition in a pocket of its outer body, preferably it is a RFID tag, which increases patient safety, because it prevents usage beyond the product's lifetime and other hazards caused by connecting unsuitable, inappropriate fibers to the laser source. By having this feature, there is a control on the coupling of unsuitable optical fibers to the laser source and only a valid optical fiber can be used.

An invalid optical fiber includes, but it is not limited to, an optical fiber that is not reusable but had already been used in other procedures, its valid lifetime had elapsed, or due to an improper size chosen it might cause an improper or unsafe laser energy dose delivery at the treatment site. Another distinctive characteristic of this connector is that the position of the RFID tag is preferably below the optical fiber, still close enough to the laser source to ensure identification. This position of the RFID allows almost any geometry of the tag within the size constraint. Therefore, compact designs with a better resistance to cleaning and autoclaving procedures are chosen, reducing the failures caused by damaged RFID-tags. In addition the RFID tag is fixed with a special medical grade epoxy.

Figure 2A:
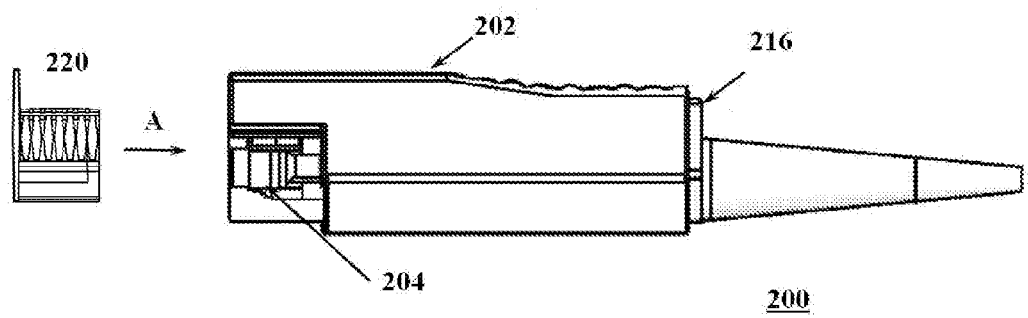
FIG. 2a shows another preferred embodiment of present invention of additional parts of a connector for coupling laser sources into optical fibers.
Figure 2B:
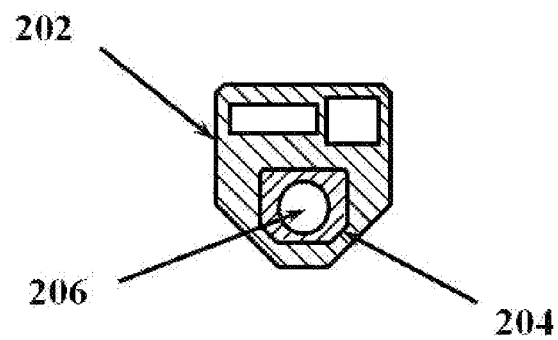
FIG. 2b shows a cross section view of one embodiment of present invention for illustrating the relative positions of the ferrule, the outer body and the inner body.

In order to protect the optical fiber at the proximal end during transport, connector 200 further comprises dust cap 220 which is shown in FIG. 2a, along with outer body 202 which has an ergonomic design for better handling connector 200; inner body 204 with a special design which allows inner body 204 to move within outer body 202; and bending protection 216 with long fiber protection end. A problem of most connectors is the positioning of the proximal end of the fiber in relation to the laser output. The fiber position within the connector can vary due to production variances, and therefore, the fiber end is not necessarily aligned. This results in a smaller power output at the distal end of the fiber. In the worst case scenario this can even result in the burning of fiber or the connector, because the lost power is absorbed by the proximal end. The design of this new connector solves this problem as the moving inner body and/or the spring-loaded ferrule ensures that the ferrule moves against a fixed position element in the laser housing via de spring load. Only longitudinal movement is possible. The shapes of all the elements are designed to be fitted into the outer housing in only one possible angle position. In addition, small indents are marked in some or all elements that fit inside the outer housing to maintain the alignment of the elements when assembled and ensure that the fiber input is always aligned and the output power of the laser goes solely through the optical fiber. Furthermore, when the optical fiber is not connected to the laser source, the position of the ferrule is moved into the outer body to protect the sensitive polished fiber end. This further decreases the probability of fiber burns in addition to the probability of unwanted laser emission or stray light. These features enhance the efficiency of radiation sources and the delivery of radiation energy in a safe and efficient manner. FIG. 2b shows a cross view indicated as A of connector 200 depicting the relative positions of ferrule 206, outer body 202 and inner body 204. It also shows the hexagonal shapes which are used for inner body 204 and outer body 202 so these are assembled in a single way, avoiding rotational movements and allowing only longitudinal movements while maintaining the alignment and enhancing the coupling of the beam.

Figure 3:
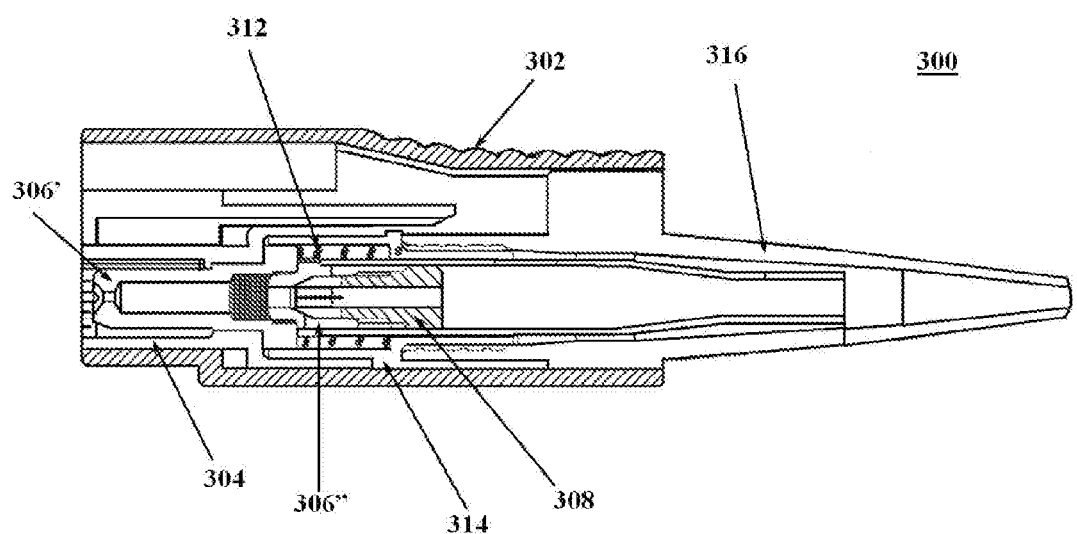
FIG. 3 is a schematic view of another preferred embodiment of present invention showing the relative position of the components of the connector for coupling medical laser sources into optical fibers.

The most important difference between connectors shown in prior art and the new connector is the possibility of the ferrule to move within the outer body, while it is still fixed in the inner body. This new feature helps to reduce unwanted power losses and produces a safer connector which preserves both the integrity of the laser source and optical fiber as well as increases the safety of the patient and the physicians who operate the devices. FIG. 3 is a schematic view of connector assembly 300 showing the relative position of inner body 304, outer body 302, distal part of ferrule 306', proximal part of ferrule 306", ferrule interlock 314, spring 312, collet chuck 308 and bending protection 316. Furthermore, in order to preserve the integrity of the connector and avoid damages which could lead to damage of the fiber and eventually generate losses, the ferrule is mounted inside the connector and does not emerge from it.

Having described preferred embodiments of the invention with reference to the accompanying drawings, it is to be understood that the invention is not limited to the precise embodiments, and that various changes and modifications may be effected therein by skilled in the art without departing from the scope or spirit of the invention as defined in the appended claims.

What is claimed is:

1. A connector for coupling radiation from at least one radiation source into a waveguide for medical applications, said connector having a distal end and a proximal end and adapted to receive an optical fiber in the distal end, comprising:
    an outer body for handling said connector;
    a spring-loaded ferrule comprising a spring;
    an inner body;
    a collet chuck having an opening adapted to receive and be compressed about the waveguide;
    a ferrule interlock; and
    a bending protection end at the distal end of the connector;
    wherein said inner body is completely contained within said outer body and moves only longitudinally within said outer body, said ferrule interlock and ferrule are completely contained within the inner body and the collet chuck is contained within the ferrule, the spring is contained within the inner body and exerts tension between the ferrule interlock and the ferrule so as to cause the spring locked ferrule to move toward the proximal end of the connector without emerging from the connector when the connector is not connected to a radiation source.

2. The connector according to claim 1, wherein said ferrule comprises two parts that fit into each other.

3. The connector according to claim 1, further comprising shrinking sleeves to ensure a good connection between the different parts of the connector.

4. The connector according to claim 1, wherein said inner body and said spring-loaded ferrule have a range of movements within said outer body for ensuring that said ferrule moves against a fixed position element in the connector via the spring load.

5. The connector according to claim 1, wherein the spring of said spring-loaded ferrule has a sufficiently high spring constant to hold said ferrule in place within said connector.

6. The connector according to claim 1, wherein said connector further comprises an electronic signature for waveguide recognition.

7. The connector according to claim 6, wherein said electronic signature is a RFID tag placed below said waveguide and close to the laser source to ensure identification of said waveguide.

8. The connector according to claim 7, wherein said RFID tag is fixed to the connector with a medical grade epoxy.

9. The connector according to claim 1, wherein said connector further comprises an electric power and signal port.

10. The connector according to claim 9, wherein said port is a Universal Serial Bus (USB) port.

11. The connector according to claim 1, wherein said radiation source is a medical laser device intended for delivery of laser light to soft or hard tissue with at least one waveguide in contact or non-contact mode during surgical or non-surgical procedures.

12. The connector according to claim 11, wherein said waveguide is an optical fiber.

13. The connector according to claim 12, wherein said optical fiber has a distal tip configuration selected from the group consisting of radial-emitting tips, circumferential-emitting tip, conically shaped distal tips, twisted shaped distal tips, side-emitting tips, front-emitting tips, double core tips, flat tips, fat tips, tips with multiple emission points, or combinations of these.

* * * * *